(12) United States Patent
Fischer et al.

(10) Patent No.: US 8,662,287 B2
(45) Date of Patent: Mar. 4, 2014

(54) SCRAPER FOR SCRAPER CHAIN CONVEYORS

(75) Inventors: Frank Fischer, Lunen (DE); Willi Klingbeil, Werne (DE); Matthias Kohler, Werne (DE); Uwe Tillessen, Kamen (DE); Jorg Wirtz, Witten (DE); Elmar Wiejack-Symann, Dinslaken (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 159 days.

(21) Appl. No.: 13/255,313

(22) PCT Filed: Mar. 5, 2010

(86) PCT No.: PCT/IB2010/050965
§ 371 (c)(1),
(2), (4) Date: Sep. 8, 2011

(87) PCT Pub. No.: WO2010/103446
PCT Pub. Date: Sep. 16, 2010

(65) Prior Publication Data
US 2011/0315519 A1    Dec. 29, 2011

(30) Foreign Application Priority Data
Mar. 10, 2009  (DE) .......................... 10 2009 003 595

(51) Int. Cl.
*B65G 19/24*    (2006.01)
(52) U.S. Cl.
USPC ........................................ 198/731; 198/733
(58) Field of Classification Search
USPC ........................................ 198/733, 734, 731
See application file for complete search history.

(56) References Cited

U.S. PATENT DOCUMENTS

| 2,094,789 A | 10/1937 | Gellatly |
| 3,955,666 A * | 5/1976 | Braun et al. .................. 198/850 |
| 4,312,443 A * | 1/1982 | Niemoller et al. ............ 198/731 |

(Continued)

FOREIGN PATENT DOCUMENTS

| DE | 2353005 A1 | 4/1975 |
| DE | 8105624 U1 | 7/1981 |

(Continued)

OTHER PUBLICATIONS

English Translation of the International Preliminary Report on Patentability dated Sep. 29, 2011 in International Application No. PCT/IB2010/050965.

*Primary Examiner* — Ramya Burgess
*Assistant Examiner* — Thomas Randazzo
(74) *Attorney, Agent, or Firm* — Foley & Lardner LLP

(57) ABSTRACT

A scraper for a scraper chain conveyor, having a top web, on which a chain attachment region for connecting the scraper to a scraper chain is configured, and having scraper wings for guiding the scraper on side profiles and bottom of a scraper chain conveyor. In order to provide scrapers with which a higher conveying output or a reduction of the drive output to be installed can be achieved, and which also enable a worn or defective scraper to be changed below ground, it is provided according to the invention that the scraper wings consist of a holding portion anchored to the metallic top web and a plastics sliding insert which can be releasably fastened to the holding portion. For the sliding inserts and their retention, various embodiments are proposed.

27 Claims, 5 Drawing Sheets

(56) References Cited

U.S. PATENT DOCUMENTS

| | | | |
|---|---|---|---|
| 4,383,603 A * | 5/1983 | Niemoller et al. | 198/731 |
| 4,573,568 A | 3/1986 | Maag et al. | |
| 4,600,097 A * | 7/1986 | Temme et al. | 198/731 |
| 4,684,009 A * | 8/1987 | Rehbein et al. | 198/731 |
| 4,756,404 A | 7/1988 | Maag et al. | |
| 5,249,664 A * | 10/1993 | Steinkuhl | 198/731 |
| 5,931,283 A * | 8/1999 | Meya | 198/731 |
| 6,595,351 B2 * | 7/2003 | Malitzki | 198/731 |
| 7,159,707 B2 * | 1/2007 | Malitzki et al. | 198/731 |
| 7,775,342 B2 * | 8/2010 | Merten et al. | 198/731 |
| 8,162,131 B2 * | 4/2012 | Perry | 198/731 |
| 2004/0140178 A1 | 7/2004 | Wiejack-Symann et al. | |

FOREIGN PATENT DOCUMENTS

| | | |
|---|---|---|
| DE | 3317682 A1 | 11/1984 |
| DE | 10225341 C1 | 10/2003 |
| EP | 0099481 A1 | 2/1984 |
| EP | 1276685 A1 | 1/2003 |
| GB | 2139981 A | 11/1984 |
| WO | 01/81211 A1 | 11/2001 |
| WO | 2004/048234 A1 | 6/2004 |
| WO | 2004/065270 A1 | 8/2004 |

* cited by examiner

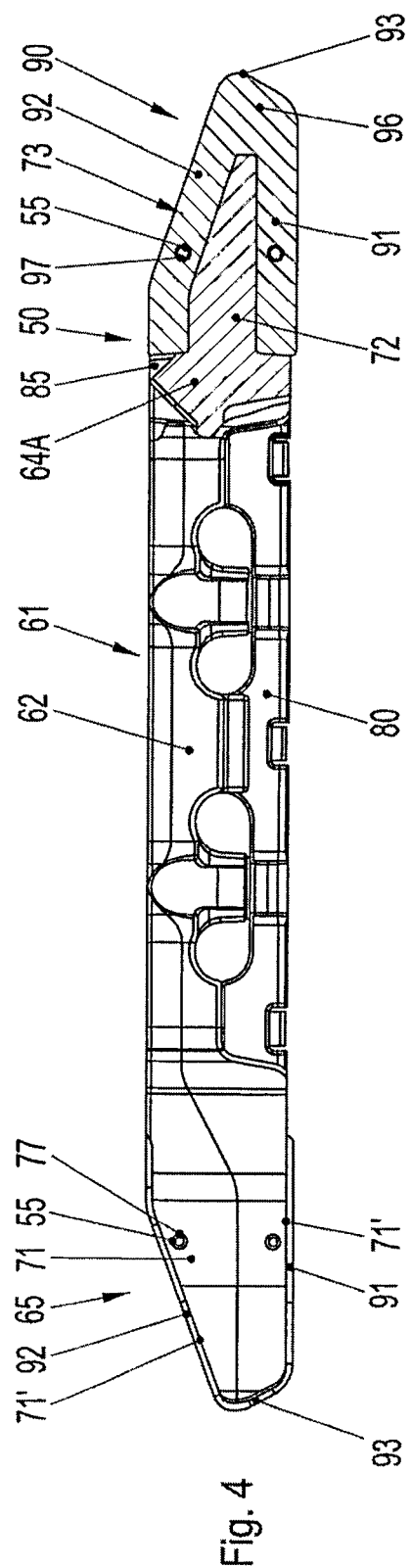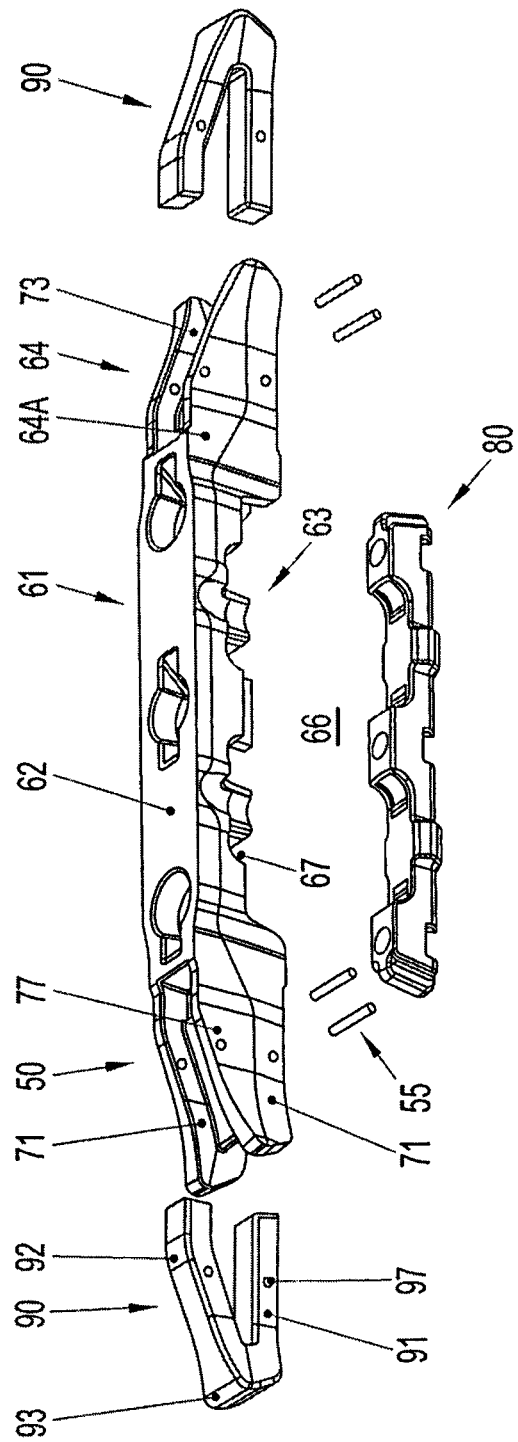
Fig. 4
Fig. 5

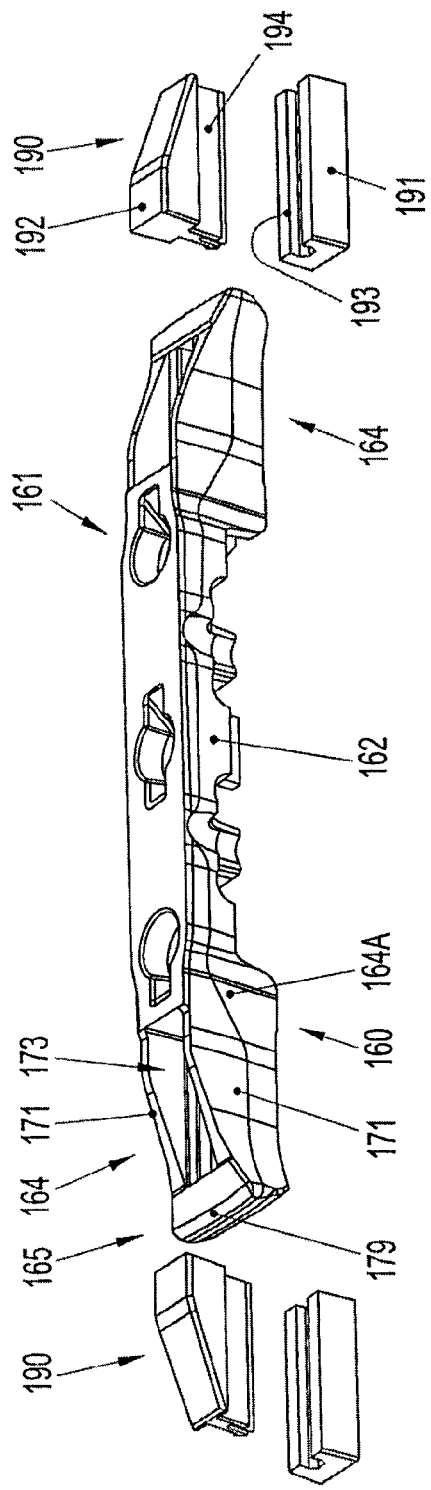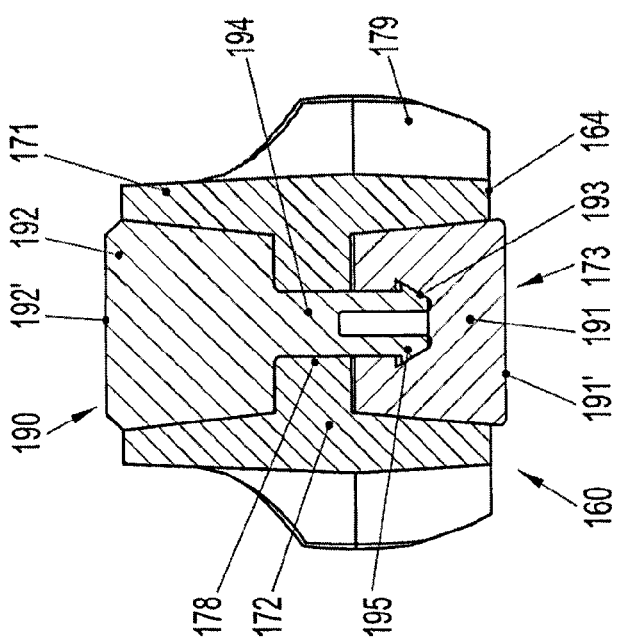

SCRAPER FOR SCRAPER CHAIN CONVEYORS

The invention relates to a scraper for a scraper chain conveyor, having a top web, on which a chain attachment region for connecting the scraper to a scraper chain is configured, and having scraper wings for guiding the scraper on side profiles and bottom of a scraper chain conveyor, wherein the scraper wings respectively consist of a holding portion, which is anchored to the metallic top web, and a plastics sliding insert for each scraper wing, which plastics sliding insert can be releasably fastened to the holding portion by means of retaining means.

BACKGROUND OF THE INVENTION

In mineral extraction, particularly in underground mining, scraper chain conveyors, which can be configured as single scraper chain or double scraper chain conveyors, are used. Scraper chain conveyors of the generic type are used, in particular, as face conveyors, in which, over large face lengths, the mined material has to be continuously evacuated with the scrapers fastened to the revolving scraper chain and transferred onto further conveying devices, such as drift conveyors, which can also consist of belt conveyors. A scraper chain conveyor generally has at both its ends a chain drive, with which the endless scraper chain revolving in the upper strand and lower strand is driven with the scrapers which are connected thereto.

A scraper for a so-called double-middle scraper chain conveyor, having a scraper web, a chain attachment region and scraper wings formed integrally onto the scraper web is known from DE 102 25 341 C1, to which is incorporated by reference herein in supplementation of the present disclosure.

In the prior art, ambitions to minimize the forces which shall be transmitted from the respective drives into the revolving scraper chain, in order to be able to reduce the capacities installed at the drives or, with the same capacity, transport higher quantities with the same scraper chain, have long existed. In EP 1 276 685 B1, it is proposed to this effect to make the scraper chain and/or the scrapers consist at least partially of a plastic which is self-extinguishing, flame-retardant and has anti-static properties, together with high mechanical strength. Through the use of plastic as the material for making the scraper chain and/or the scraper, a reduction in the weight of the scraper is intended to be achieved, whereby the drive capacity to be installed can be designed smaller or a larger conveying volume can be handled. According to one illustrative embodiment of EP 1 276 685 B1, the scraper is intended to consist of a metallic sheath, the interior of which is filled with a plastic and, according to another illustrative embodiment, the scraper is intended to be made fully of a suitable plastic, where possible the scraper chain also.

From WO 2004/048234 A1 it is known to make the entire scraper of plastic, the plastics scraper being intended to be connected to the metal chain links of a metallic scraper chain. In order to achieve a close attachment between scraper and chain, the fully plastics scraper is intended to be cast directly onto the chain links of the scraper chain. A drawback with this is that the connection can only be established above ground, so that the entire scraper chain would have to be brought from below ground to above ground in order to exchange such scrapers. An exchange of individual scrapers in the installed state of the scraper chain in the scraper chain conveyor is impossible.

DE 23 53 005 A1 discloses scrapers for a single-chain conveyor, in which a link of the simple chain is inserted between the top web and the top side of a chain clamp in order to connect the scraper to the simple chain. In order to reduce noise and wear, the sliding surface of the scraper consists of plastic. To this effect, the bottom side of the chain clamp can be coated with a plastics sliding surface, or it is provided with a plastics moulding which is anchored in a dovetailed transverse groove running transversely to the motional direction. In addition, the scraper wing ends can consist of exchangeable plastics caps, which are respectively fastened to a holding portion on the top web by means of a clamping sleeve. The plastics caps are provided on their bottom side with slide beads.

For double-middle scraper chain conveyors, it is known from WO 2004/065270 to have the top web and the chain clamp consist of different materials in order to minimize the weight of the scraper. As materials for the top part, plastic, aluminium or ceramics are proposed in order to obtain a top part which is as lightweight as possible. The scraper ends can also consist of end caps, which are movably fastened to the top part by means of clamping sleeves and a tongue and groove connection, for which holding portions are configured on the top web, which holding portions form the tongue and engage in a horizontal groove on the inner sides of the end caps.

SUMMARY OF THE INVENTION

An object of the invention is to provide scrapers for scraper chain conveyors, with which, with a long tool life, a higher conveying capacity or a reduction of the drive capacity to be installed can be achieved, and which also enable a worn or defective scraper to be exchanged or changed below ground.

This object and others are achieved according to the invention by virtue of the fact that each holding portion has two metallic side webs which are distanced apart by an interspace, the interspace being configured to receive a sliding body lug on the plastics sliding inserts. The inventive solution hence aims to realize the connecting region or chain attachment region between scraper and scraper chain still metallically via the top web and, at the same time, to provide plastics sliding inserts which can be releasably connected to holding portions on the metallic top web. The top web and the holding portions form a metallic scraper body of very high strength, according to the material. Each holding portion has two side webs which are distanced apart by an interspace, the interspace being configured between the side webs to receive a plastics sliding body lug on the sliding inserts. According to the size and dimensioning of the side webs, which preferably project downwards over the top web and, in particular, can also approximately determine the maximum height of a scraper, it is possible to achieve an outcome whereby the mined material is moved essentially only by means of metallic surfaces, namely the top web on the one hand and the side webs of the holding portions on the other hand, whereas the sliding inserts made of the substantially lighter plastic preferably only assume a guide function for the scrapers and form the contact surfaces to the scraper chain conveyor. The side webs then assume a protective function for the sliding inserts and at least largely prevent direct contact between the mined material and the plastic of the sliding inserts.

The plastic sliding inserts can here preferably fully form the sliding or guide surfaces with which the respective scraper guides itself on side profiles or on the bottom of a scraper chain conveyor. The plastics sliding inserts then not only serve as pure filling elements for weight reduction purposes, as proposed in part in the prior art, but they also assume a guide function, whereby the wearing of the conveyor floor can be simultaneously reduced, since this, in the operational use of a scraper chain conveyor, no longer interacts with metallic surfaces, but with plastics sliding surfaces.

In a preferred embodiment, the holding portions are configured integrally on the top web and consist of the same material as the top web. This enables the top web and holding portions to consist of castings, where appropriate also of forgings, and to obtain a shaping which can acquire as few corners or edges as possible, but rather fluid transitions instead. The top web and holding portion could also, however, be produced separately and welded together.

The basic concept according to the invention, namely of anchoring plastics sliding inserts to a metal scraper body, can in principle be used in almost all models of scrapers as have already been proposed in the prior art. In the particularly preferred embodiment of an inventive scraper, an insertion pocket is configured on the bottom side of the top web between the holding portions, and the insertion pocket can be closed off from below by means of a clamp, whereby the chain attachment region is configured between the bottom side of the top web and the top side of the clamp. The clamp can preferably likewise consist of metal and be suitably anchored to the top web by screwing, by pinning, by means of clamp straps or the like. Further preferably, the top web on its bottom side and/or the clamp on its top side can be provided with a plurality of leg beds for legs of chain links of a double-middle scraper chain in order to achieve a particularly favourable support between the metallic scraper body on the one hand and the metallic chain links on the other hand. In order at the same time to achieve a particularly favourable and shear-resistant connection between the clamp and the top web, it is advantageous if the holding portions, on their rear sides delimiting the insertion pocket, are provided with grooves for the positive engagement of web portions on the free clamp ends of the clamp. It is then sufficient to insert the clamp from below into the insertion pocket, whereby the web portions engage in the grooves and anchor the clamp positively in the motional direction to the metallic scraper body consisting of top web and holding portions. The locking means between the clamp and the top web are then almost totally relieved of the respective forces. How such a connection between the clamp and the top web can be realized with grooves on the inner sides of the scraper wings is described in detail in DE 102 25 341 C1, to whose disclosure content is incorporated by reference herein in supplementation of the present description.

According to one advantageous embodiment, the interspace can be divided by means of a preferably horizontally lying transverse leg into interspace portions, each interspace portion being configured to receive a sliding body lug on the sliding insert.

In one embodiment, the sliding insert can be of clasp-like configuration and, at mutually spaced ends of clasp legs which form the sliding body lugs and are connected to each other at a middle part, can be provided with locking protrusions as retaining means. The locking protrusions can then preferably engage in recesses on the transverse leg and be latched to the metallic scraper body in the manner of a snap hook with undercut. The snap hook connection, which can be established or released by utilization of the deformability of the clasp-like plastics sliding insert, lies, due to the side webs, in the protected, load-free region and can to this extent, without additional securing elements, effect a secure holding of the sliding inserts on the holding portions of the metallic scraper bodies. Alternatively or additionally, the sliding inserts can have clasp legs, which are provided with transverse bores for the penetration of retaining means such as, for example, clamping sleeves, roll pins or the like. The sliding insert can also be of clasp-like configuration and have two differently long clasp legs, which are connected at a middle part and form the sliding body lugs, the middle part preferably being provided with a transverse bore for the penetration of a locking pin as retaining means. Self-evidently, both a snap hook connection and a connection by means of retaining means could be provided. The retaining means could also consist of a fastening screw or the like, which is screwed directly into the sliding insert or which can be screwed into threaded sleeves or the like which are pressed or cast into the corresponding transverse bores. The transverse bores can also be penetrated by clips or spring clamps, or the locking elements could by means of snap connections prevent release of the clasp legs relative to the side webs or interspace portions.

In the case of clasp-like sliding inserts, it is particularly advantageous if the clasp legs of the sliding inserts diverge in a V-shape, the clasp-like sliding insert being able to be slid onto the holding portion with the free clasp leg ends to the fore and, in the fitted state, protruding at least outwards and downwards beyond the side webs in order that, due to the protrusion, the guide surface and contact surface of the scraper with bottom and side profiles of a scraper chain conveyor can consist largely or exclusively of surface portions of the sliding inserts or can be formed by these. The protrusion, at least downwards over the side webs, should hence be sufficient for the sliding inserts, in operational use, to be configured or provided as a single contact surface with the conveyor floor in the upper strand. In the lower strand, the profiling of the lower strand bottom can already cause the scraper itself to then rest only with the plastics sliding inserts on the lower strand bottom if the top surface of the sliding inserts protrudes upwards beyond the contour line of the side webs, yet ends flush with the top surface of the top web. In addition, the sliding inserts can also protrude at the top, however, not only beyond the side webs, but also beyond the top surface of the top web. Further preferably, removal bevels which open out into the interspace can be configured on the top web to release the sliding body inserts from the interspaces. The removal bevels have particular advantages if the sliding inserts are secured with a snap hook connection, yet in all retaining variants of the sliding body inserts in the interspaces can facilitate the underground release of the sliding inserts.

The sliding inserts can preferably consist of a plurality of fixedly connected plastics sheets. Such sliding inserts are particularly easy to produce, with a high degree of freedom in terms of the shaping.

In a further alternative embodiment, the side webs of each holding portion can be connected to each other at their web ends by a transverse web and form a receiving frame which is open at the top and bottom, yet laterally closed, plug-together pairs of sliding inserts being able to be fastened into the interspace delimited all the way round by side webs and transverse webs. In this embodiment, it is particularly advantageous if on the mutually facing inner sides of the side webs are configured clamping legs which project over the same and to which the sliding insert pair, in the fitted state, is fixed in the vertical direction. Each sliding insert pair can in particular have a preferably U-shaped bottom part and a preferably T-shaped top part, which can be plugged together by means of a tongue and groove connection as retaining means through a gap between the clamping legs. The tongue and groove connection can once again be held together by a hook connection or the like in order to prevent release of the parts of the sliding insert pair. In this embodiment also, it is particularly advantageous if, in the fitted state of the sliding insert pair, the bottom surface of the bottom part protrudes downwards and the top surface of the top part protrudes upwards beyond the holding portion. In this embodiment, only minimal areas of the sliding inserts are exposed, whilst the metallic scraper body extends over the entire width of the scraper and runs also in the side profiles of the scraper chain conveyor.

The side webs can run outwardly arched in the direction of their web ends. The distance between the side webs, and the width of the interspace, can increase in the direction of the free web ends. Alternatively, the distance between the side webs, and the width of the interspace, can be constant.

The invention also relates to sliding inserts for corresponding scrapers, wherein, according to the invention, the sliding inserts consist of plastic and are releasably fastenable in the interspace between metallic side webs, configured on holding portions, of a correspondingly configured scraper. The sliding inserts can be locked in place directly via snap connections or bonded connections, or merely indirectly by means of separate locking means in interspaces between side webs and/or a transverse leg of the holding portions, whereby no direct loads can be exerted upon the sliding body lugs and upon the connecting regions between scraper and sliding insert by the masses which are to be moved.

The sliding inserts can in principle consist of any suitable plastic of sufficient strength. As plastics, thermoplastics, in particular polyamides such as PA6, PA12 or PA6.6, are especially suitable. Further advantageously, fibre-reinforced plastics, which are reinforced, for example, to the value of 20% to say 50%, with glass fibres or carbon fibres or other suitable fibres, can be considered. Depending on the embodiment and the material used, the sliding inserts can be produced in a casting process, in particular in a die-casting process.

Further advantages of an inventive scraper with exchangeable sliding insert emerge from the following description of preferred illustrative embodiments shown schematically in the drawing.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 4 shows an inventive scraper according to a second illustrative embodiment in side view, partially fragmented;

FIG. 5 shows the scraper from FIG. 4 in exploded representation;

FIG. 8 shows an inventive scraper according to a fourth illustrative embodiment in exploded representation; and FIG. 9 shows a vertical section through a holding portion of a sliding insert pair in respect of the scraper according to FIG. 8.

DETAILED DESCRIPTION OF EMBODIMENTS

Figure 1:
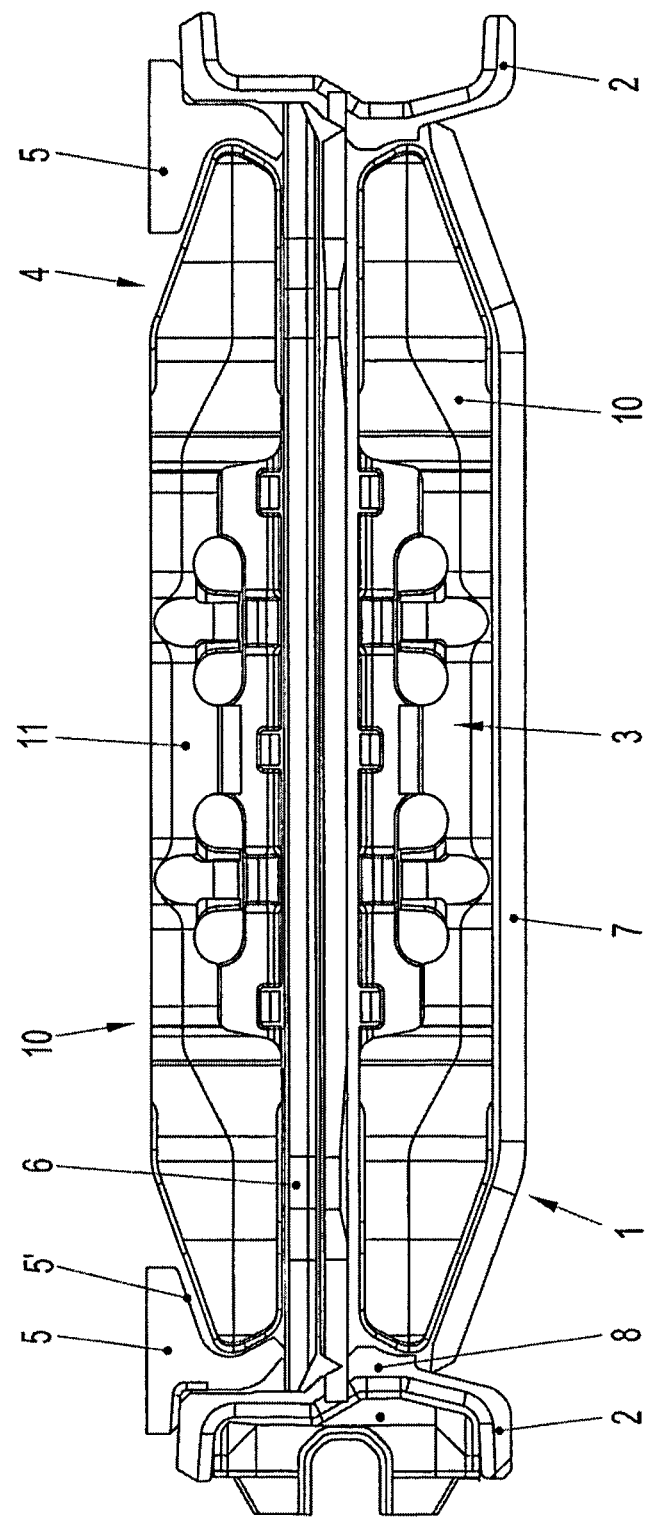
FIG. 1 shows schematically a vertical section through a trough pan of a scraper chain conveyor, with inventive scrapers according to a first illustrative embodiment guided therein.

Referring now to the drawings wherein the showings are for the purpose of illustrating preferred and alternative embodiments of the invention only and not for the purpose of limiting same, FIG. 1 shows a trough pan 1 of a scraper chain conveyor (not further represented), as is used, in particular, in underground mining for the evacuation of the mineral, for example coal, ore or the like, mined at the working face with a mining machine. A scraper chain conveyor consists of a multiplicity of identical trough pans 1, which are interconnected in an angularly movable manner, and drives, which are positioned at both ends of a face and are connected to the trough pans 1, for making the scrapers 10 shown in FIG. 1 revolve with a scraper chain (not represented) for the material evacuation. In a manner which is known per se, each trough pan 1 has lateral side cheeks 2, which rise up substantially vertically and between which a lower situated lower strand 3 and a high situated upper strand 4 are configured. The upper strand 4 forms the conveying strand, in which the material is transported by means of the scrapers 10 to one of the two face ends. All the scrapers 10 are generally of identical construction and in the shown illustrative embodiment are constituted by scrapers for a so-called double-middle scraper chain conveyor, since two chain lanes (not shown), lying side by side, revolve in the upper strand 4 and lower strand 3 and each scraper 10 is connected to chain links of both scraper chains. As is clearly revealed by the schematic representation in FIG. 1, the scrapers 10 in the upper strand 4 are guided by means of lateral side profiles 5 and a conveyor floor 6. The scraper 10 rests approximately over the whole of its width on the conveyor floor 6 and guides itself with the peripheral surfaces of the scraper ends of the scrapers 10 on the inner profile 5' of the side profiles which scrapers have a suitable profile shape for this purpose. Each scraper 10 passes through the return strand or lower strand 3 tilted through 180° and the scrapers 10 rest in the lower strand on a lower strand bottom 7. At the same time, they can also be laterally guided in the lower strand 3 with suitable profiled bosses 8, for example on the side cheeks 2. On an up to two metre chain length of a scraper chain, depending on the size and conveying capacity of a scraper chain conveyor, one to four scrapers 10 are used, and at the same time the scraper chains (not shown) consist of relatively heavy, metallic chain links, so that altogether, with the drives installed at the face ends, relatively high drive powers must be transmitted to the scraper chain in order to move the scrapers 10 and the material transported with the same.

The basic structure of a scraper chain conveyor is known to the person skilled in the art. The invention relates in particular to the use of preferably exchangeable plastics sliding inserts on the inventive scrapers 10, for which purpose each scraper 10 has a metallic scraper body 11, on which the chain attachment region containing the chain links of the scraper chain is configured and to which, moreover, the plastics sliding inserts are anchored, preferably in an easily releasable manner. This inventive basic concept is now explained with reference to further FIGS. 2 to 9, in which different illustrative embodiments of inventive scrapers are represented.

Figure 2:
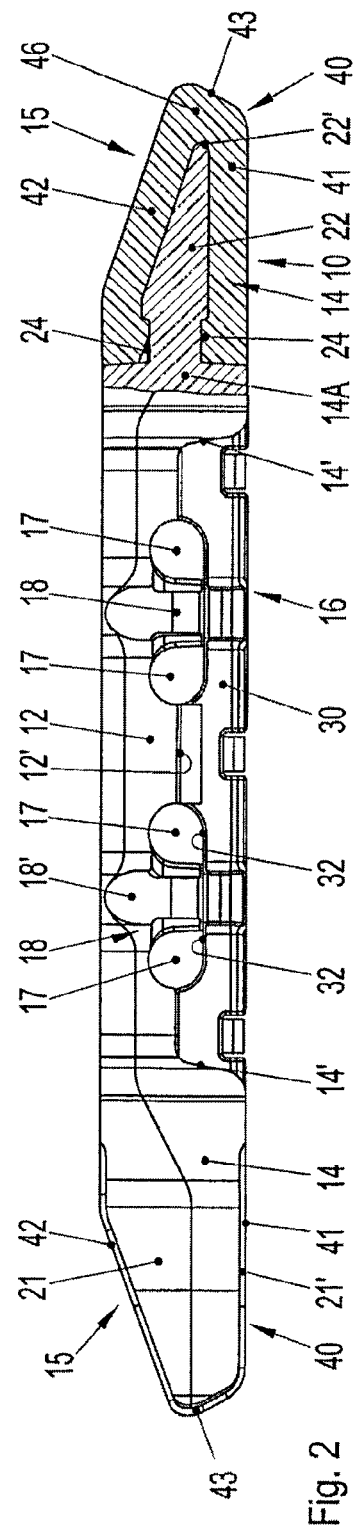
FIG. 2 shows the scraper from FIG. 1 in single representation, partially fragmented.
Figure 3:
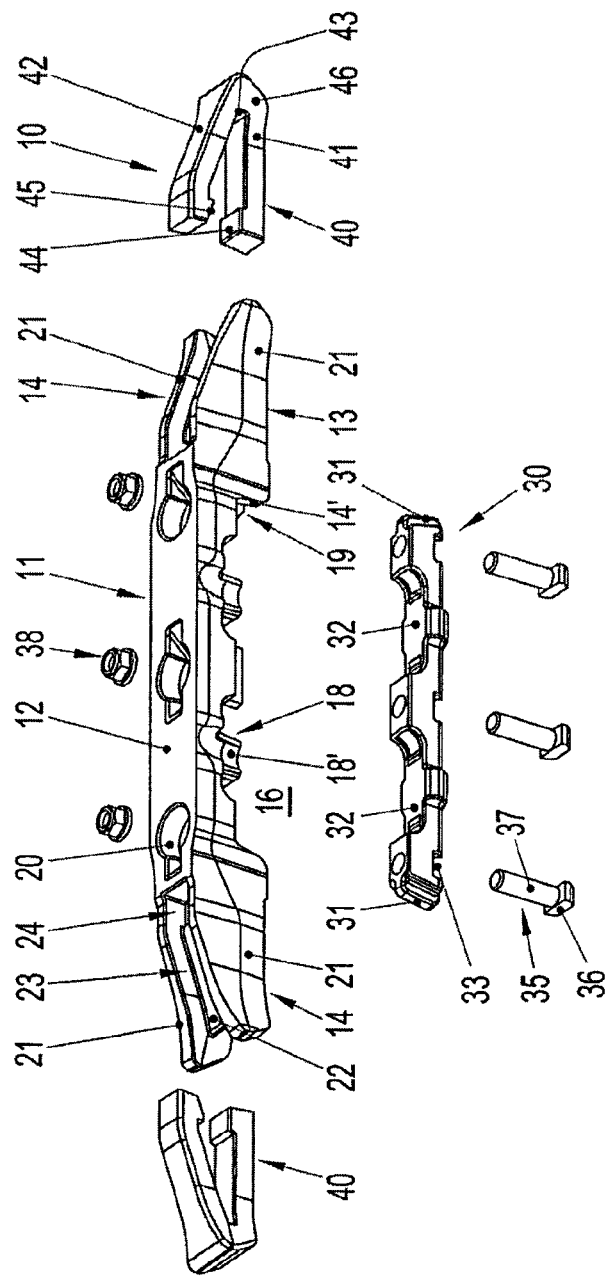
FIG. 3 shows the scraper from FIG. 2 in exploded representation.

In FIGS. 2 and 3, the scraper 10 according to FIG. 1 is represented in isolation. The metallic scraper body 11, which here consists of a casting, comprises as basic components a top web 12, the bottom side of which forms one-half of the chain attachment region 13, and two lateral holding portions 14, integrally connected to the top web 12, for the releasable fastening of plastics sliding inserts 40 to the scraper body 11. In the fitted state of the scraper 10, as shown in FIG. 2, sub-portions of the holding portions 14 form together with the sliding inserts 40 scraper wings 15 of the scrapers 10.

Firstly, the structure of the metallic scraper body 11, as well as the fastening of metallic, eye-like chain links of a metallic double-middle scraper chain (not further represented) on the scraper body 11, is now described. As clearly revealed by FIGS. 2 and 3, the top web 12 has roughly half the height of the scraper wings 15 or the holding portions 14. Beneath the top web 12 is configured an insertion pocket 16, in which a clamp 30 as a removable bottom piece for the chain attachment region 13 is insertable. The bottom side 12' of the top web 12 is here provided with four leg beds 17 for the link legs of horizontal chain links (not shown) of the scraper chain, and between the adjacent chain link beds 17 of a horizontal chain link there is respectively configured a stud 18, which projects downwards over the bottom side 12' of the top web 12 and which, in the fitted state of the scraper 10 on a scraper chain, intrudes into the eye aperture of an inserted horizontal chain link. The stud 18 is provided on its end faces pointing in the direction of conveyance with a hollowing 18', so that the rounded chain bows of vertical chain links (not shown) connecting the horizontal chain links can come to bear against the stud 18 with good relative mobility. The holding portions 14 have rear sides 14', which laterally delimit the insertion pocket 16 for the clamp 30. As is evident from FIG. 3, on the inner sides 14' are configured vertically running grooves 19, into which T-shaped web portions 31 at the free ends of the clamp 30, in the fitted state, can intrude in order to positively fix the clamp 30 in the motional direction relative to the scraper body 11. At the same time, the clamp 30 has once again on its top side leg beds 32, which respectively lie opposite the leg beds 17 on the top web 12. In the shown illustrative embodiment, the clamp 30 is fastened to the top web 12 of the scraper body 11 by three hammer-head screws 35, which with their hammer heads 36 engage in cavities 33 on the bottom side of the clamp 30 and reach with their threaded shank 37 through associated bores 34 in the clamp 30 and in the top web 12. Onto the free end of the threaded shank 37 can respectively be screwed a fastening nut 38, which in the fitted state respectively engages in a sink hole 20 on the top side of the top web 12 and, in the tightened state, lies concealed and, to this extent, protected in the sink hole 20. Since preferably the clamp 30 and the scraper body 11 consist of a suitable metal, such as, in particular, steel, an extremely stable, close connection between the scraper 10 on the one hand and the scraper chain (not represented) on the other hand can be achieved with the scraper body 11 and clamp 30, which connection even meets the requirements placed upon high-performance conveyors.

The scraper 10 is altogether configured symmetrically to a centre plane and has no preferred motional direction. The inventive scraper acquires a reduction in weight and improved running characteristics, in particular as a result of the sliding inserts 40, which are releasably fitted on the holding portions 14 in order to form with the holding portion 14 on the one hand and sliding insert 40 on the other hand a scraper wing 15. The holding portion 14 extending over the maximum height of the scraper body 11 has two mutually spaced side webs 21, which here also form protective plates and extend integrally from the top web 12 and which are curved outwards in the direction of the free ends in order that the scraper wing 15 has the greatest width at the scraper wing ends and, as a result of the curvature, better transport characteristics for material carried with the scrapers 10 is achieved. Running between both side webs 21 is a transverse leg 22, which is here configured like an undercut arrow tip and tapers in the direction of its tip 22'. Respectively above and beneath the transverse leg 22 is configured an interspace portion 23, which serves for the fitting and protected positioning of the here clasp-like sliding insert 40. As is clearly revealed by the fragmented representation in FIG. 2, in the attachment region between the transverse leg 22 and the base portion 14A of the holding portion 14, a hollow 24 is respectively formed, so as to anchor the clasp-like sliding inserts 40 via a snap connection or snap hook connection to the correspondingly undercut transverse leg 22 of the holding portion 14. The clasp-like sliding insert 40 according to the illustrative embodiment in FIGS. 2 and 3 consists of a suitable plastic, such as, for example, a polyamide with sufficient deformability to enable it to be slightly widened when the holding portions 14 are banged. The clasp-like sliding insert 40 has a lower clasp leg 41 and an upper clasp leg 42, which are connected at a middle part 46 and the distance apart of which widens from the apex 43 on the middle part 46 of the sliding insert 40. The sliding insert 40 has the greatest width in the region of apex 43 on the middle part 46 and is profiled in the region of the apex 43 or middle part 46. Whilst the lower clasp leg 41 runs approximately horizontally and in the direction of the apex and increases only in its width, the upper clasp leg 42 runs obliquely, so that the distance between the clasp legs 41, 42 continually widens in the direction of the free ends of the clasp legs 41, 42, which free ends lie remote from the apex 43. For the snap hook connection, on the mutually facing surfaces of the free ends of the clasp legs 41, 42 are respectively configured retaining bosses 44 or 45 as sliding body lugs, which in the fitted state engage in the hollows 24, as is shown by FIG. 2. The sliding inserts 40 are fitted on the scraper bodies 11 from the side, i.e. transversely to the motional direction of the scrapers or of a scraper chain, by sliding, in particular banging of the plastics sliding inserts 40 into the interspace portions between the side webs 21. For the fitting of the sliding insert 40, the deformability of the plastic is exploited, until the sliding body lugs 44, 45 latch into the hollows 24 on the transverse leg 22. In the fitted state, the sliding insert 40 completely fills the interspace 23 between the side webs 21. At the same time, the top side of the upper clasp leg 42, the bottom side of the lower clasp leg 41 and the outer surface on the leg 43 protrude slightly beyond the peripheral surfaces 21' of the side webs 21, whereby the scrapers 10 in the region of the scraper wings 15 bear essentially solely via the sliding inserts 40 against the conveyor floor (6, FIG. 1) or against the inner sides of the side profiles (5 in FIG. 1). The sliding inserts 40 therefore yield not only a considerable weight reduction due to the replacement of metallic regions of the scraper wings by plastic, but they also at the same time ensure better running characteristics and lesser wear on the conveyor-side guide portions (conveyor floor, side profile) of the scraper chain conveyor. The sliding inserts 40 can be disassembled relatively easily by, for example, cutting through one of the clasp legs and then removing the largely destroyed sliding insert. After this, a new sliding insert can be fitted with little effort. The disassembly could also however be aided by a draft or the like, which preferably opens out into the upper interspace 23 between the side webs 21.

FIGS. 4 and 5 show a second illustrative embodiment of an inventive scraper 50, in which both the metallic scraper body 61, inclusive of the clamp 80, and the sliding inserts 90 have virtually the identical structure as in the previous illustrative embodiment. The scraper body 61 too has a top web 62, on the bottom side of which are configured leg beds 67 and which with its bottom side forms one portion of the chain attachment region 63. Here too, a clamp 80 can be inserted into an insertion pocket 66 in order to anchor horizontal chain links between the clamp 80 on the one hand and the top web 62 on the other hand. The clamp 80 has at its ends web portions, which engage in grooves on the rear sides of the base portions 64A of the holding portions 64 so as to fix the clamp 80 in the motional direction in order that, with the fastening means (not shown here), only the clamp 80 must be secured against release from the scraper body 61. As in the previous illustrative embodiment, the sliding inserts 90 are also of clasp-like construction and have a lower, substantially rectilinear clasp leg 91 and an upper clasp leg 92 running obliquely thereto, which clasp legs converge to a point at a middle part 96 to form an apex 93, at which the sliding inserts 90 have the greatest width dimension. The releasable fastening of the clasp-like sliding inserts 90 in the interspace 73 between the side webs 71 of the holding portions 64 is here not realized, however, by a clamping hook connection, but instead by means of simple dowel pins or plug-in sleeves 55, for whose fitting in the side webs 71 aligned plug-in bores 77 and in the clasp legs 91, 92 insertion bores 97 are respectively provided. As is clearly revealed by FIG. 4, in the fitted state the dowel pin 55 penetrates respectively both the metallic side webs 71 in the bores 77 and the bores 97 in the clasp legs 91, 92. Hence, for the release, only the plug-in sleeves 55 must be driven out of the bores 77, 97 so as then to lift the clasp-like sliding inserts 90 out of the sub-interspaces and pull them down from the, in this case, non-undercut transverse legs 72. FIG. 4 clearly reveals that, in the case also of the scraper 50, in the fitted state the clasp legs 91, 92 and the apex 93 protrude downwards, laterally and upwards beyond the peripheral edge 71' of the side webs 71 in order that the guidance of the scrapers 50 in the region of the scraper wings 65 is effected solely via the envelope surfaces of the sliding inserts 90, and, to this extent, not via metal. The protrusion of the lower clasp legs downwards over the contour line 71' of the side webs 71 is dimensioned such that the sliding inserts 90 can form with their lower clasp legs 91 the sole bearing surface or contact surface with a conveyor floor (cf. FIG. 1), hence the scraper in the upper or conveying strand makes contact with the scraper chain conveyor only with the plastics sliding insert, i.e. a metallic contact between scraper and scraper chain conveyor is completely or largely avoided. Also the sliding inserts 90 could be additionally secured by means of a clamping hook connection and/or the transverse leg could either be realized as a thin band or be completely dispensed with so as further to reduce the weight of the scrapers. In FIG. 4, the lower contour line 71' of the side webs is aligned with the bottom side of the scraper body. As in the previous illustrative embodiment, the lower contour line could also be provided with an offset. The disassembly of both sliding inserts 90 is aided by a draft 85, which from the top web 62 opens out into the upper interspace 73 between the side webs 71 and into which a release tool such as a lever can be inserted in order to push the sliding inserts 90 by pressure outwards, hence down from the transverse legs 72, onto the end faces of the upper clasp legs 91.

Figure 6:
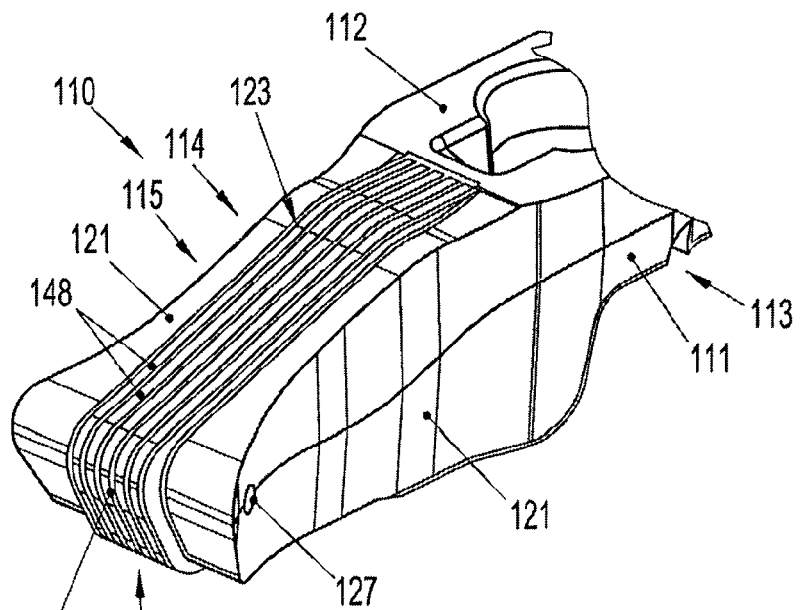
FIG. 6 shows in perspective view a scraper wing of an inventive scraper according to a third illustrative embodiment in exploded representation.
Figure 7:
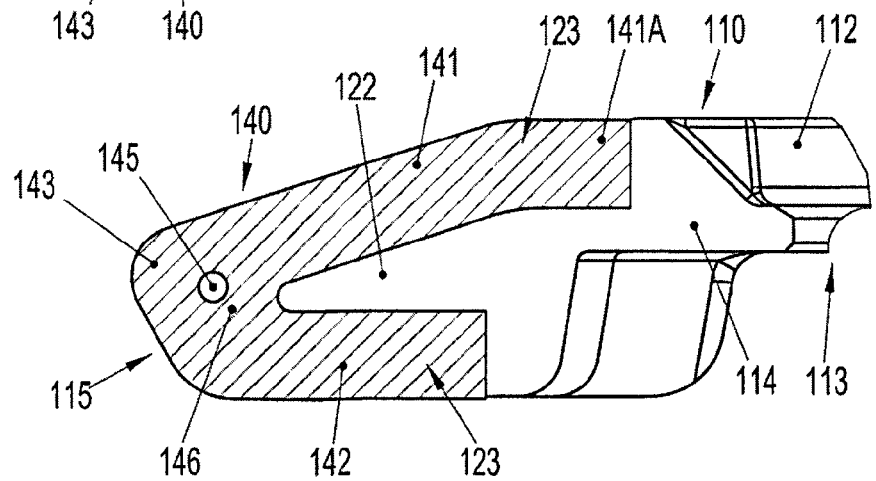
FIG. 7 shows a vertical section through a holding portion with fitted sliding insert in respect of the scraper according to FIG. 6.
Figure 7A:
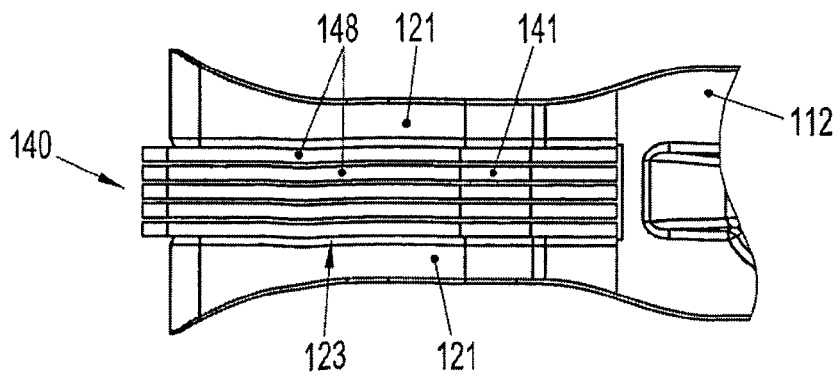
FIG. 7A shows a top view of a scraper wing with fitted sliding insert in respect of the scraper according to FIG. 6.

FIGS. 6, 7 and 7A show a third illustrative embodiment of an inventive scraper 110. The figures show only that end region of the top web 112 of the scraper body 111 which is situated on the scraper wing side. The chain attachment region 113 and the clamp (not shown) are configured identically as in the previous two illustrative embodiments, so that, in order to avoid repetitions, reference can be made to the description provided there. In the case of the scraper 110, the holding portions 114 once again have two side webs 121 which are spaced apart via interspace portions 123 and between which is configured a transverse leg 122, and the side webs 121 once again extend to both sides of the interspaces 123 approximately as far as the outer ends of the scraper wings 115. The interspaces 123 are filled with a clasp-like plastics sliding insert 140, which protrudes along the envelope contour of the interspace portions 123 at top and bottom beyond the side webs and also projects at the wing end outwards over the side web in order that the contact surface of the scraper 110 with the trough pan is formed, as exclusively as possible, by means of the plastics surface of the sliding insert 140. In the case of the scraper 110, the side webs 121 widen in the direction of the free web ends, since the outer sides extend with a correspondingly arched profile, as is clearly revealed, above all, by FIG. 7A. The side webs 121 here form in the motional direction of the scraper 110 protective plates for the clasp legs 141, 142, which fill the interspace portions and are square or rectangular in cross section, of the sliding insert 140 inclusive of the middle part 146 which interconnects the clasp legs 141, 142, whilst the apex 143 of the middle part 146 protrudes laterally beyond the side webs 121. The curvature of the side webs 121 at the same time improves the transport characteristics of the scrapers 110, whereby essentially only the metallic material of the side webs 121 makes contact with the material to be conveyed, such as rubble, coal or ore.

As FIG. 7 shows, the clasp legs 141, 142 are unequal in length and the upper clasp leg 141 is longer than the lower clasp leg 142. The lower clasp leg 142 runs straight over the whole of its length, whilst the upper clasp leg 141, for the formation of a roughly V-shaped sliding insert 140, extends obliquely from the middle part 146 and only at its inner end merges into a leg portion 141A running parallel to the lower clasp leg 142. The sliding insert 140 has a constant width over the whole of its length, i.e. is here exactly as wide at the apex 143 as at the inner end portions 141A of the clasp legs 141, 142. Correspondingly, the distance between those inner sides of the side webs 121 which delimit the interspace portions 123 is also constant. The sliding insert can therefore here consist of individual, for example bonded-together plastics sheets 148, between which individual plastics sheets stabilization layers could also be arranged. The plastics sheets could respectively consist of polyamide, for example.

The sliding insert 140 can essentially be slid loosely from the wing ends onto the holding portions 114, whereupon the upper clasp leg 141 is slid into the upper interspace 123 and the lower clasp leg 141 into the lower interspace 123. In the middle part 146, the sliding insert 140 has a transverse bore 145, which runs horizontally or in the motional direction and in which engages, in the fitted state, a plug-in sleeve fitted via bores 127 in the side webs 121. The plug-in sleeve can form the sole retaining means for the sliding insert. The sliding insert can however also be clamped with deformation stress to the spade-shaped transverse leg 122 and/or be bonded in the interspaces 123.

FIGS. 8 and 9 show a fourth illustrative embodiment of an inventive scraper 160. The top web 162 of the metallic scraper body 161 is once again configured identically as in the previous illustrative embodiments, so that reference can be made to the description provided there. The scraper 160 is fastened to a scraper chain (not shown) by an identical clamp as in the previous illustrative embodiments, for which reason the clamp is omitted in FIGS. 8 and 9. The scraper body 161 once again preferably consists of a metallic casting having holding portions 164 formed integrally onto the top web 162 so as to form with these same, as well as with sliding inserts 190 fastened thereto, scraper wings 165, in which the guidance between the scraper chain conveyor and the scraper 160 is largely realized via outer surfaces of the sliding inserts 190. Unlike in the previous illustrative embodiments, in the case of the scraper 160, however, the wing end of the scraper wings 165 is also formed from a metallic portion of the scraper body 161, and the side webs 171, which extend outwards at a distance apart, with the formation of an interspace 173, are connected to each other by a transverse web 179, which forms the outer envelope surface of the scraper wings 165 and, for this purpose, is profiled on its outer side in accordance with the desired profile shape of the scraper wings 165. In operational use, the scraper 160 guides itself on the inner sides of the guide profiles of a scraper chain conveyor, therefore with the metallic transverse web 179 of the holding portion 164. The side webs 171, the base portion 164A and the transverse web 179 delimit a box-shaped interspace 173, in which a two-part sliding insert pair 190 formed of plastics parts can be releasably anchored. The sliding insert pair 190 consists of a plastics bottom part 191, here of approximately U-shaped cross section, and a top part 192, here of approximately T-shaped cross section, which can be plugged together and fastened to each other by means of a tongue and groove connection. A preferably dovetailed groove 193 in the bottom part 191 receives a clamping web 194, which projects downwards on the top part 192 and the free end of which is configured as an undercut wedge-shaped web 195, which can be inserted into the groove 193 and there secures the bottom part 191 and top part 192 against release. The top part 192 tapers outwards in adaptation to the profile shape of the holding portions 164 in the region of the scraper wings 165. In order to anchor the bottom part 191 and top part 192 of the sliding insert pair 190 in the interspace 173 between the side webs in the vertical direction, a clamping leg 172, which divides the interspace 173 into two interspace portions interconnected only by a gap 178 between the clamping legs 172, respectively projects over the inner sides of the side webs 171. In the fitted state, the clamping web 194 on the top part 192 of the sliding insert pair 190 penetrates the gap 178. FIG. 9 clearly reveals that the bottom surface 191' of the bottom part 191 protrudes downwards over the metallic envelope surface of the holding portions 164 inclusive of the solid, profiled and outward widening transverse web 179, and also the top part 192 rises with its top side 192' upwards over the holding portion 164, so that the scraper, at least on the conveyor floor or the lower strand bottom of the scrapers 160, is guided over the exposed envelope surfaces of the plastics sliding insert pair 190.

For the person skilled in the art, the preceding description gives rise to numerous modifications which shall fall within the scope of the appended claims. The illustrative embodiments show a connection of plastics sliding inserts or sliding heads and metallic holding portions on the scraper body via a snap lock, via dowel pins and via a plug connection. Additionally or alternatively, the sliding inserts could also be bonded to the holding portions, secured by a dowel pin connection or fixed by means of a screw connection. For the screw connection, threaded metal sleeves, for example, in which corresponding fastening screws engage, could be pressed or cast into the plastics sliding inserts. Several of these fastening methods could also be mutually combined so as to achieve a particularly secure connection between the plastics sliding inserts on the one hand and the metallic scraper bodies on the other hand. The sliding inserts could consist of different materials. As plastic, thermoplastics such as, in particular, polyamides are suitable. As additional protection against wear, the sliding inserts could be reinforced with fibres such as glass or carbon fibres. Where appropriate, the fibre reinforcements or other reinforcement inlays can be provided only in the surface layers of the sliding inserts. In the individual illustrative embodiments, the metallic regions, particularly in the region of the transverse legs and of the side webs, could be made narrower to allow the use of correspondingly larger sized sliding inserts, which preferably completely fill the generated interspace, and thereby additionally lower the weight of the hybrid scrapers. The size and extent of the side webs can be varied in order to make the material to be moved make only virtual full-faced contact with the metallic scraper body in the motional direction, whilst the sliding inserts form only the contact and bearing surfaces on the conveyor floor, lower strand bottom and, where appropriate, in the side profiles and at the same time protect the holding lugs of the sliding pieces within the interspaces against loads. The locking variants shown in the individual illustrative embodiments could also be mutually combined and be supported, for example, by a bonding. The invention is not therefore limited to the shown illustrative embodiments.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A scraper for a scraper chain conveyor, the scraper comprising:
    a metallic top web, on which a chain attachment region for connecting the scraper to an associated scraper chain is configured;
    scraper wings configured for guiding the scraper on side profiles and a bottom of an associated scraper chain conveyor, the scraper wings including a holding portion, which is anchored to the top web;
    a plastic sliding insert for each scraper wing, which plastic sliding insert is releasably fastenable to the holding portion by a retainer;
    wherein each holding portion has two metallic side webs that run outwardly in the direction of their web ends, and which are distanced apart by an interspace, the interspace having a width between the side webs that receives a sliding body lug on the sliding inserts.

2. The scraper according to claim 1, wherein the holding portions are configured integrally on the top web and consist of the same material as the top web.

3. The scraper according to claim 1, wherein an insertion pocket is configured on the bottom side of the top web between the holding portions, the insertion pocket being closable off from below by a clamp, the chain attachment region being configured between the bottom side of the top web and the top side of the clamp.

4. The scraper according to claim 3, wherein at least one of the top web on its bottom side and the clamp on its top side is provided with a plurality of leg beds for legs of associated chain links of an associated double-middle scraper chain.

5. The scraper according to claim 3, wherein the holding portions, on their rear sides delimiting the insertion pocket, are provided with grooves for the positive engagement of web portions on the free clamp ends of the clamp.

6. The scraper according to claim 1, wherein the interspace is divided by a transverse leg, each interspace being configured to receive a sliding body lug.

7. The scraper according to claim 6, wherein the sliding insert is of clasp-like configuration and, at mutually spaced ends of clasp legs which form the sliding body lugs and are connected at a middle part, is provided with locking protrusions as the retaining means.

8. The scraper according to claim 7, wherein the clasp legs of the sliding inserts diverge in a V-shape, the clasp-like sliding insert being able to be slid onto the holding portion with the free clasp leg ends to the fore and, in the fitted state, protruding at least outwards and downwards beyond the side webs.

9. The scraper according to claim 8, wherein the protrusion, at least downwards over the side webs, is sufficient for the sliding inserts, in operational use, to be configured or provided as a single contact surface of the scraper wings with the conveyor floor.

10. The scraper according to claim 6, wherein the sliding insert is of clasp-like configuration and has two clasp legs, which form the sliding body lugs and are connected at a middle part and which are provided with transverse bores for the penetration of locking pins as the retaining means.

11. The scraper according to claim 10, wherein the clasp legs of the sliding inserts diverge in a V-shape, the clasp-like sliding insert being able to be slid onto the holding portion with the free clasp leg ends to the fore and, in the fitted state, protruding at least outwards and downwards beyond the side webs.

12. The scraper according to claim 11, wherein the protrusion, at least downwards over the side webs, is sufficient for the sliding inserts, in operational use, to be configured or provided as a single contact surface of the scraper wings with the conveyor floor.

13. The scraper according to claim 6, wherein the sliding insert is of clasp-like configuration and has two differently long clasp legs, which are connected at a middle part and form the sliding body lugs, the middle part being provided with a transverse bore for the penetration of a locking pin as retaining means.

14. The scraper according to claim 13, wherein the clasp legs of the sliding inserts diverge in a V-shape, the clasp-like sliding insert being able to be slid onto the holding portion with the free clasp leg ends to the fore and, in the fitted state, protruding at least outwards and downwards beyond the side webs.

15. The scraper according to claim 14, wherein the protrusion, at least downwards over the side webs, is sufficient for the sliding inserts, in operational use, to be configured or provided as a single contact surface of the scraper wings with the conveyor floor.

16. The scraper according to claim 6, wherein removal bevels which open out into the interspace are configured on the top web to release the sliding body lugs from the interspaces.

17. The scraper according to claim 1, wherein the sliding inserts consist of a plurality of fixedly connected plastics sheets.

18. The scraper according to claim 1, wherein the side webs of each holding portion are connected at their web ends by a transverse web, with plug-together sliding insert pairs are fastenable in the interspace delimited all the way round by the side webs and the transverse web.

19. The scraper according to claim 18, wherein on the mutually facing inner sides of the side webs are configured as clamping legs which project over the same.

20. The scraper according to claim 19, wherein each sliding insert pair has a U-shaped bottom part and a T-shaped top part, which can be plugged together by a tongue and groove connection as the retaining means through a gap between the clamping legs.

21. The scraper according to claim 20, wherein, in the fitted state of the sliding insert pair, the bottom surface of the bottom part protrudes downwards and the top surface of the top part protrudes upwards beyond the holding portion.

22. The scraper according to claim 1, wherein the side webs run outwardly arched in the direction of their web ends.

23. The scraper according to claim 1, wherein the distance between the side webs, and the width of the interspace, increases in the direction of the free web ends.

24. The scraper according to claim 1, wherein the distance between the side webs, and the width of the interspace, is constant.

25. A sliding insert for a scraper for a scraper chain conveyor, the scraper having a metallic top web, on which a chain attachment region for connecting the scraper to a scraper chain is configured, and having scraper wings for guiding the scraper on the side profiles and bottom of a scraper chain conveyor, the scraper wings include a holding portion which is anchored to the top web, the holding portion having two metallic side webs that run outwardly curved in the direction of their web ends and which are distanced apart by an interspace having a width that increases in the direction of the web ends between the outwardly curved side webs, the sliding insert comprising:
a plastic body having a width that expands in the direction of the web ends and being shaped to fit within the increasing width of the interspace, and releasably fastenable in the interspace between the metallic side webs of the scraper.

26. The sliding insert according to claim 25, wherein the sliding insert is lockable in place by a separate locking means on at least one of the side webs and a transverse leg of an associated holding portions of the associated scraper.

27. The sliding insert according to claim 26, wherein the locking means includes at least one of an insertion bore, a pin and a retaining boss.

* * * * *

UNITED STATES PATENT AND TRADEMARK OFFICE
CERTIFICATE OF CORRECTION

PATENT NO. : 8,662,287 B2  Page 1 of 1
APPLICATION NO. : 13/255313
DATED : March 4, 2014
INVENTOR(S) : Fischer et al.

It is certified that error appears in the above-identified patent and that said Letters Patent is hereby corrected as shown below:

In the Specification,

Column 7, line 62, delete "scraper" and insert -- scraper 10 --.

Column 9, line 38, delete "sub-interspaces" and insert -- sub-interspaces 73 --.

Signed and Sealed this
Eighth Day of September, 2015

Michelle K. Lee
*Director of the United States Patent and Trademark Office*